US008605243B2

(12) United States Patent
Sato

(10) Patent No.: US 8,605,243 B2
(45) Date of Patent: Dec. 10, 2013

(54) LIQUID CRYSTAL DISPLAY DEVICE

(75) Inventor: Takao Sato, Mobara (JP)

(73) Assignees: Japan Display Inc., Tokyo (JP);
Panasonic Liquid Crystal Display Co., Ltd., Hyogo-ken (JP)

( * ) Notice: Subject to any disclaimer, the term of this patent is extended or adjusted under 35 U.S.C. 154(b) by 118 days.

(21) Appl. No.: 13/038,549

(22) Filed: Mar. 2, 2011

(65) Prior Publication Data

US 2011/0216265 A1 Sep. 8, 2011

(30) Foreign Application Priority Data

Mar. 4, 2010 (JP) ................................ 2010-047707

(51) Int. Cl.
*G02F 1/1343* (2006.01)
*G02F 1/1335* (2006.01)

(52) U.S. Cl.
USPC ............................................ 349/139; 349/61

(58) Field of Classification Search
USPC ................................................. 349/139, 141
See application file for complete search history.

(56) References Cited

U.S. PATENT DOCUMENTS

| 6,259,200 | B1 * | 7/2001 | Morita et al. | 313/498 |
|---|---|---|---|---|
| 6,323,922 | B1 * | 11/2001 | Suzuki et al. | 349/110 |
| 7,440,063 | B2 * | 10/2008 | Choi et al. | 349/141 |
| 7,456,924 | B2 * | 11/2008 | Ono et al. | 349/141 |
| 7,705,949 | B2 * | 4/2010 | Ono et al. | 349/143 |
| 7,855,772 | B2 * | 12/2010 | Wang et al. | 349/144 |
| 2001/0019388 | A1 * | 9/2001 | Kim et al. | 349/129 |
| 2004/0036815 | A1 * | 2/2004 | Kim et al. | 349/38 |
| 2006/0066766 | A1 * | 3/2006 | Tanaka et al. | 349/44 |
| 2007/0229749 | A1 | 10/2007 | Kaneko et al. | |
| 2008/0007666 | A1 * | 1/2008 | Takeda et al. | 349/43 |
| 2008/0068539 | A1 * | 3/2008 | Kaneko et al. | 349/106 |
| 2008/0143907 | A1 * | 6/2008 | Kim et al. | 349/43 |
| 2008/0297678 | A1 * | 12/2008 | Lee et al. | 349/44 |
| 2009/0009708 | A1 * | 1/2009 | Higa et al. | 349/155 |
| 2009/0086135 | A1 | 4/2009 | Maede | |
| 2009/0128726 | A1 | 5/2009 | Tanno | |
| 2009/0146933 | A1 | 6/2009 | Visser et al. | |
| 2009/0207361 | A1 * | 8/2009 | Iwakabe et al. | 349/138 |

FOREIGN PATENT DOCUMENTS

| JP | 2007-264231 | 10/2007 |
|---|---|---|
| JP | 2008-521049 | 6/2008 |
| JP | 2009-80376 | 4/2009 |
| JP | 2009-122595 | 6/2009 |

\* cited by examiner

*Primary Examiner* — Mark Robinson
*Assistant Examiner* — Robert Tavlykaev
(74) *Attorney, Agent, or Firm* — Antonelli, Terry, Stout & Kraus, LLP.

(57) ABSTRACT

A liquid crystal display device includes a pixel area surrounded and defined by a first drain line, a second drain line and a first gate line and a second drain line. The pixel area includes: a first pixel part having a plurality of line-like linear electrodes and extend in a first direction; a second pixel part having a plurality of line-like linear electrodes extend in a second direction; a boundary electrode that is formed in an area sandwiched between the first pixel part and the second pixel part, and has a side edge portion inclined in the first direction and a side edge portion inclined in the second direction; and a light-blocking film that is formed in superimposition on the boundary electrode, and has sides formed to extend along the side edge portions of the boundary electrode inclined in the first and second directions.

4 Claims, 7 Drawing Sheets

LIQUID CRYSTAL DISPLAY DEVICE

CLAIM OF PRIORITY

The present application claims priority from Japanese Application JP 2010-047707 filed on Mar. 4, 2010, the content of which is hereby incorporated by reference into this application.

BACKGROUND OF THE INVENTION

1. Field of the Invention

The present invention relates in general to liquid crystal display devices and, in particular, to a liquid crystal display device including a liquid crystal display panel of an IPS system having a comb-like electrode and a planar electrode disposed to sandwich an insulating film therebetween.

2. Description of the Related Art

Significant advances have lately been made in display performance of liquid crystal display devices including a liquid crystal display panel as a display device and such display devices have met many application fields. Use of the liquid crystal display panel, in particular, permits a thinner and lighter display device main unit that consumes less electric power. The liquid crystal display panel is thus used as display devices of varying sizes from large-sized ones, such as TV receivers and monitors of information processing units, to small-sized ones, such as portable information terminals.

The liquid crystal display panel, for its outstandingly excellent characteristic as compared with conventional display devices, is widely used even in, for example, medical diagnostic imaging units. In a typical medical diagnostic imaging unit, a doctor as an interpreter of a radiograph makes a diagnosis based on a diagnostic image having a wide dynamic range imaged by, for example, X-ray equipment or tomographic X-ray equipment and displayed on a display device. The display device used for medical X-ray diagnostic equipment is therefore required to offer an extremely high display luminance and image display performance in a wide dynamic range for providing high gradation performance required for interpreting the diagnostic image.

A liquid crystal display device is disclosed, for example, in JP-A-2008-521049 as a technique for satisfying these requirements. The liquid crystal display device disclosed in JP-A-2008-521049 includes two liquid crystal display panels imposed one on top of another, wherein an image with lower resolution is displayed on a liquid crystal display panel closer to a backlight as a light source than a liquid crystal display panel remote therefrom, to thereby make the liquid crystal display device capable of displaying an image with a wide dynamic range.

JP-A-2009-122595 discloses a technique for forming, in a liquid crystal display device of an IPS system, a planar first electrode for each of pixels disposed in a matrix pattern and a second electrode (a linear electrode, a comb-like electrode) formed of a comb-like electrode and a slit via an insulating film. Through the foregoing arrangement, the technique disclosed in JP-A-2009-122595 reduces an unusual domain at a slit end, specifically, region in which a liquid crystal is not controlled by an image signal applied to the pixel, thereby improving transmissivity of the liquid crystal display device to achieve image display with high luminance.

SUMMARY OF THE INVENTION

In the technique disclosed in JP-A-2008-521049, light emitted from the backlight (hereinafter referred to as a backlight ray) passes through the two liquid crystal display panels superimposed one on top of another and is then radiated from a display surface side. It is therefore unfortunately likely that a reduced maximum value of display luminance will result as compared with a liquid crystal display device incorporating only one liquid crystal display panel.

Meanwhile, the technique disclosed in JP-A-2009-122595 reduces the unusual domain region at the slit end; however, the technique is not concerned at all with formation of the unusual domain in an area in which two slits with different inclination directions are formed.

The present invention is made in view of the above problems. It is an object of the present invention to provide a technique that can expand a dynamic range without allowing transmissivity of a liquid crystal display device of an IPS system to be reduced.

(1) To solve the foregoing problems, a first aspect of the present invention provides a liquid crystal display device comprising: a plurality of drain lines; a plurality of gate lines intersecting the drain lines; and a pixel area surrounded and defined by the drain lines and the gate lines. The pixel area includes: a first pixel part having a flat surface-like planar electrode, and a plurality of line-like linear electrodes that are formed in superimposition on the planar electrode via an insulating film and extend in a first direction; a second pixel part having the planar electrode and a plurality of line-like linear electrodes that are formed in superimposition on the planar electrode via the insulating film and extend in a second direction; a boundary electrode that is formed in an area sandwiched between the first pixel part and the second pixel part, and has a side edge portion inclined in the first direction and a side edge portion inclined in the second direction; and a light-blocking film that is formed in superimposition on the boundary electrode, and has sides formed to extend along the side edge portions of the boundary electrode inclined in the first and second directions.

(2) To solve the foregoing the problems, a second aspect of the present invention provides a liquid crystal display device comprising a liquid crystal display panel, and a backlight source that illuminates a back surface of the liquid crystal display panel with a backlight ray. The liquid crystal display panel includes: a first substrate having a plurality of drain lines; a plurality of gate lines intersecting the drain lines; and a pixel area surrounded and defined by the drain lines and the gate lines; a second substrate disposed to face the first substrate; and a liquid crystal layer clamped between the first substrate and the second substrate. The pixel area includes: a planar first electrode; and a linear second electrode formed in superimposition on the first electrode via an insulating film. The second electrode includes a linear electrode extending in a first direction; a linear electrode extending in a second direction; an electrode formed by integrating the linear electrode extending in the first direction with the linear electrode extending in the second direction at a boundary between the linear electrode extending in the first direction and the linear electrode extending in the second direction; and a light-blocking film formed in superimposition on the electrode formed by integrating the linear electrode extending in the first direction with the linear electrode extending in the second direction, the light-blocking film blocking the backlight ray that passes through the electrode formed by integrating the linear electrode extending in the first direction with the linear electrode extending in the second direction.

(3) To solve the foregoing the problems, a third aspect of the present invention provides a liquid crystal display device comprising: a plurality of drain lines; a plurality of gate lines intersecting the drain lines; and a pixel area surrounded and defined by the drain lines and the gate lines. The pixel area includes: a planar first electrode; a second electrode having a linear electrode that is formed in superimposition on the planar electrode via an insulating film and a slit with closed both ends; and a light-blocking film superimposed on an end of the slit.

The aspects of the present invention can expand the dynamic range without allowing transmissivity of the liquid crystal display device of the IPS system to be reduced.

Other effects of the present invention will become apparent from the following description.

DETAILED DESCRIPTION OF THE EMBODIMENTS

Figure 1:
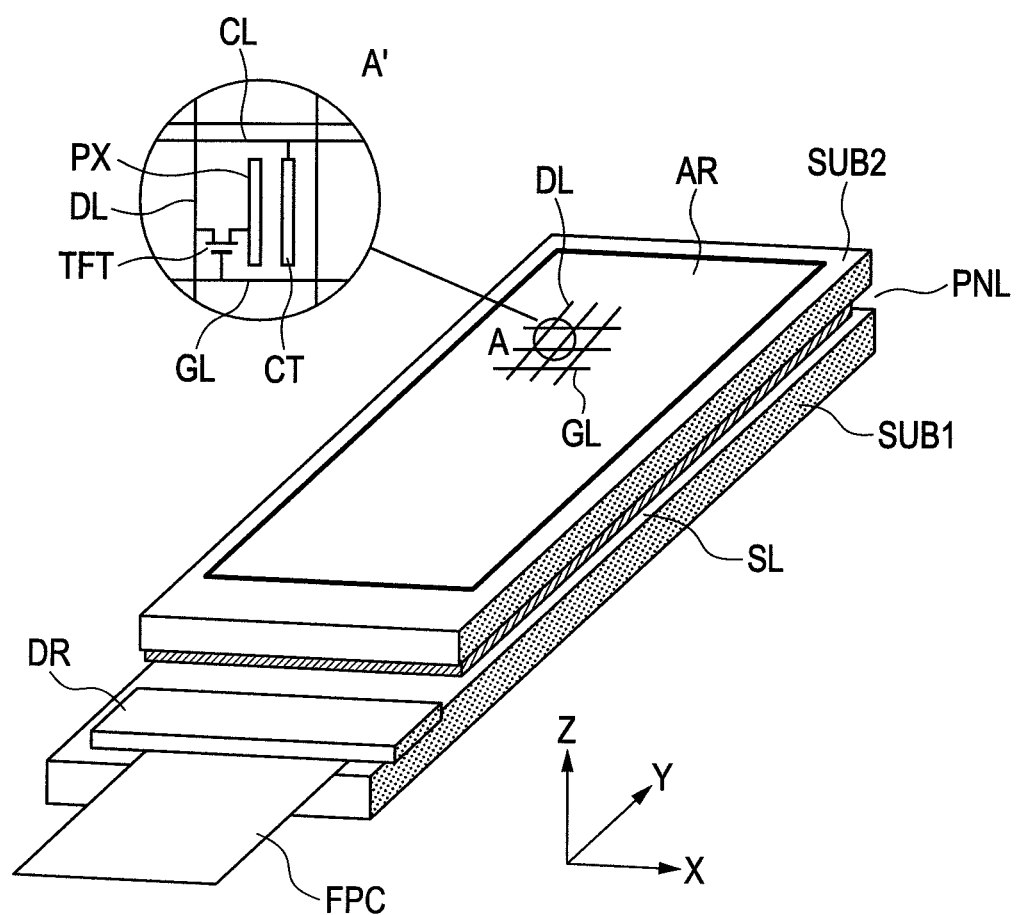
FIG. 1 is a perspective view for illustrating a general arrangement of a liquid crystal display device according to a first embodiment of the present invention.

Preferred embodiments of a liquid crystal display device in accordance with the present invention will be described below with reference to the accompanying drawings. In the descriptions that follow hereunder, like or equal parts are identified by the same reference numerals and repetitive descriptions for those parts will be omitted.

First Embodiment

General Arrangement

FIG. 1 is a perspective view for illustrating a general arrangement of a liquid crystal display device according to a first embodiment of the present invention. The general arrangement of the liquid crystal display device according to the first embodiment of the present invention will be described below with reference to FIG. 1.

The liquid crystal display device according to the first embodiment of the present invention is formed to include a liquid crystal display panel PNL combined with a backlight unit. Specifically, the liquid crystal display panel PNL includes a first substrate SUB1, on which, for example, a pixel electrode is formed, a second substrate SUB2 disposed to face the first substrate SUB1, on which a color filter or a black matrix is formed, and a liquid crystal layer not shown clamped between the first substrate SUB1 and the second substrate SUB2. The backlight unit not shown serves as a light source for the liquid crystal display panel PNL. The first substrate SUB1 and the second substrate SUB2 are fixed and the liquid crystal is sealed with a sealant SL applied annularly to a peripheral portion of the second substrate SUB2. In the descriptions that follow, the term "liquid crystal display device" will also be used below in describing the liquid crystal display panel PNL.

Typically, a well-known glass substrate, as an example, is used for the first substrate SUB1 and the second substrate SUB2. The glass substrate is, however, not the only possible material used and another type of insulating substrate, such as silica glass or plastic (resin), may be used. Use of the silica glass, for example, allows a process temperature to be increased, so that a gate insulating film of a thin-film transistor TFT to be described later can be made denser for improved reliability. In contrast, if a plastic (resin) substrate is used, the resultant liquid crystal display device has lightweight and highly impact resistant.

In the liquid crystal display device according to the first embodiment of the present invention, of an area charged with the liquid crystal, that in which a display pixel (hereinafter referred to as a "pixel") is formed is a display area AR. Accordingly, an area in which the pixel is not formed and which thus does not involve in displaying is not the display area AR, even if the area falls within the area charged with the liquid crystal.

In the liquid crystal display device according to the first embodiment of the present invention, scanning lines (gate lines) GL and video signal lines (drain lines) DL are formed within the display area AR on a surface of the first substrate SUB1, which is on the side of the liquid crystal. More specifically, the gate lines GL extend in an x direction in FIG. 1 and are disposed in juxtaposition in a y direction. The drain lines DL extend in the y direction in FIG. 1 and are disposed in juxtaposition in the x direction.

A rectangular area surrounded by the drain lines DL and the gate lines GL forms an area in which a pixel is formed. This results in each pixel being disposed in a matrix pattern within the display area AR. Referring to, for example, an enlarged view A' of a portion A encircled in FIG. 1, each pixel includes a thin-film transistor TFT, a pixel electrode PX, and a common electrode CT. Specifically, the thin-film transistor TFT is turned ON by a scanning signal from the gate line GL. The pixel electrode PX is supplied with a video signal from the drain line DL via the thin-film transistor TFT that is turned ON. The common electrode CT is connected to a common line CL and supplied with a common signal having reference potential for potential of the video signal. In the arrangement of the common electrode CT shown in the enlarged view A', the common signal is inputted to the common electrode CT formed independently for each pixel via the common line CL. This is, however, not the only possible arrangement and the common electrode CT may be formed such that the common electrodes CT of pixels arrayed adjacently in the x direction are directly connected and that the common signal is inputted via the common line CL from either one or both of lateral ends (end portions of the first substrate SUB1) in the x direction.

Each of the drain lines DL and the gate lines GL has an end portion thereof extending beyond the sealant SL and connected to a semiconductor chip DR which is disposed on the liquid crystal surface side of the first substrate SUB1 larger than the second substrate SUB2 and on which a driver circuit is formed. In the liquid crystal display device according to the first embodiment of the present invention, the driver circuit is formed with the semiconductor chip DR and mounted on the first substrate SUB1; however, either or both of a video signal driver circuit outputting a video signal and a scanning signal driver circuit outputting a scanning signal may be mounted on a flexible printed circuit board FPC by Tape Carrier Package or Chip on Film (COF) and connected to the first substrate SUB1.

Detailed Arrangement of Pixel

Figure 2:
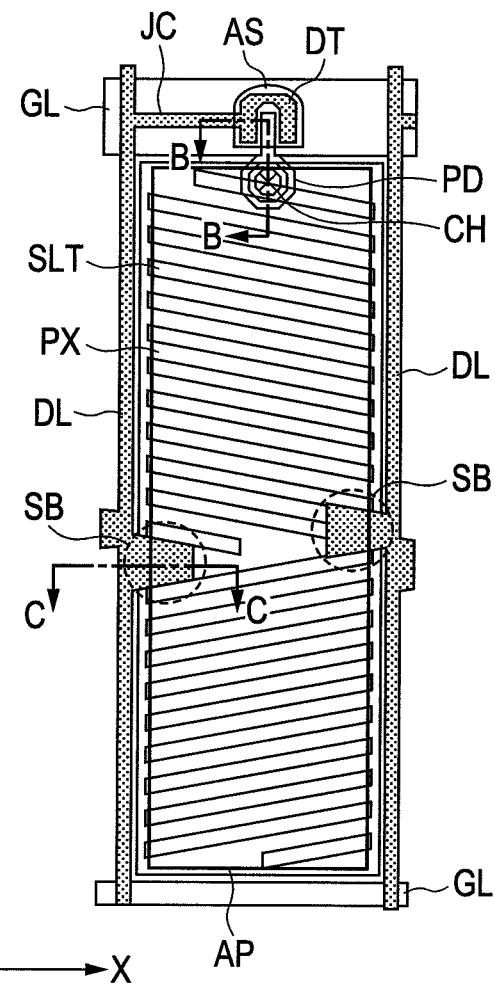
FIG. 2 is a plan view for illustrating a pixel arrangement in the liquid crystal display device according to the first embodiment of the present invention.
Figure 3:
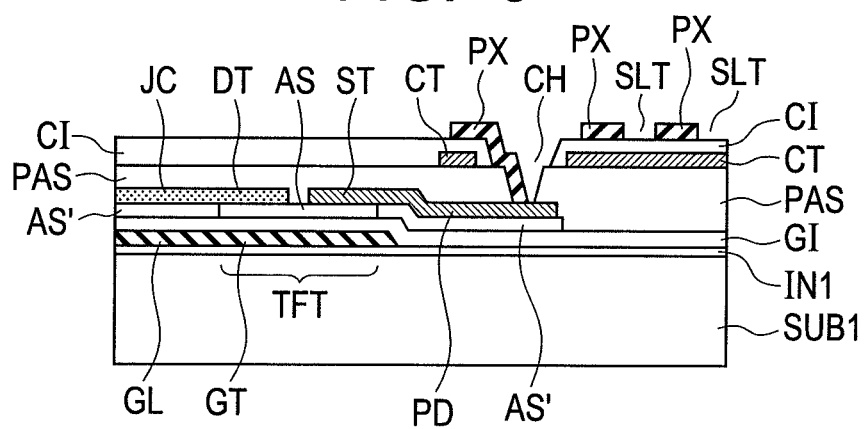
FIG. 3 is a cross-sectional view taken along line B-B of FIG. 2.
Figure 4:
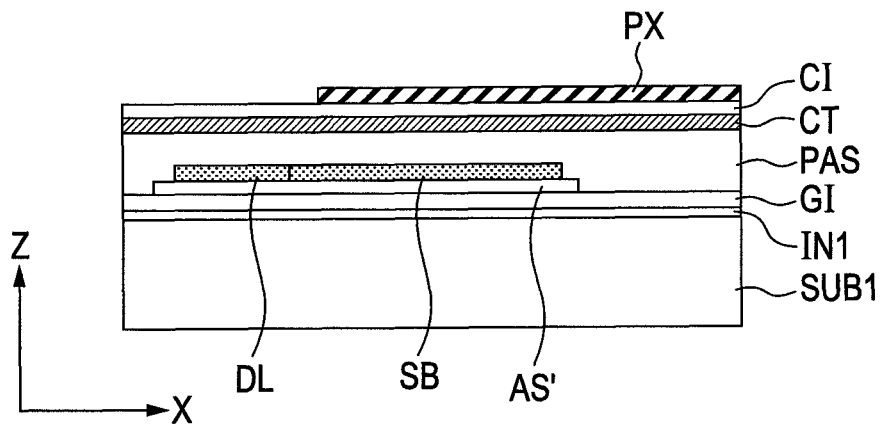
FIG. 4 is a cross-sectional view taken along line C-C of FIG. 2.

FIG. 2 is a plan view for illustrating a pixel arrangement in the liquid crystal display device according to the first embodiment of the present invention. FIG. 3 is a cross-sectional view taken along line B-B of FIG. 2. FIG. 4 is a cross-sectional view taken along line C-C of FIG. 2. The pixel arrangement in the liquid crystal display device according to the first embodiment of the present invention will be described below with reference to FIGS. 2 to 4. To simplify descriptions, FIGS. 2 to 4 show only the first substrate SUB1 and omit a well-known alignment layer. In addition, formation of thin films including a light-blocking film SB is enabled by well-known photolithography and a detailed description of the formation method will be omitted.

Referring to FIG. 2, in the liquid crystal display device according to the first embodiment of the present invention, a pixel area is defined by the gate lines GL extending in the x direction and disposed in juxtaposition in the y direction and the drain lines DL extending in the y direction and disposed in juxtaposition in the x direction. This arrangement results in the pixels being formed in a matrix pattern in the liquid crystal display device according to the first embodiment of the present invention. In addition, in the liquid crystal display device according to the first embodiment of the present invention, the flat sheet-like common electrode CT formed of, for example, a transparent conductive material of ITO (indium-tin-oxide) is formed on the surface (facing surface) of the first substrate SUB1, which is adjacent to the liquid crystal. The common electrode CT is formed at side portion of the first substrate SUB1 in a superimposed relation with the common line CL, resulting in being electrically connected to the common line CL. In the first embodiment of the present invention, the gate lines GL and the drain lines DL are formed of a metal thin film.

Referring to FIG. 3, an underlayer film IN for protecting the thin-film transistor TFT is formed on the surface of the glass substrate SUB1 and the gate line GL or the common line CL is formed on an upper layer of the underlayer film IN. The upper layer includes an insulating film GI formed thereon so as to cover, for example, the gate line GL and the common line CL. The insulating film GI functions as a gate insulating film for the thin-film transistor TFT in an area to be described later in which the thin-film transistor TFT is formed. A film thickness and other parameters are set for the insulating film GI as required.

A noncrystalline semiconductor layer AS formed of, for example, an amorphous silicon is formed on an upper surface of the insulating film GI at a position at which the insulating film GI is superimposed on part of the gate line GL. The semiconductor layer AS is a semiconductor layer of the thin-film transistor TFT. The semiconductor layer AS is formed, as shown, for example, by AS' (hereinafter referred to as an amorphous silicon layer) in FIG. 3, on a lower layer of the drain line DL, a lower layer of a connection JC, and a lower layer of an extension (including a pad portion PD) of a source electrode ST to thereby minimize steps.

The drain line DL extended in the Y direction in FIG. 2 has, at a part thereof, an extension (connection) JC that extends toward the thin-film transistor TFT side. The extension JC is connected to a drain electrode DT of the thin-film transistor TFT formed on the semiconductor layer AS. In addition, the drain line DL intersects the gate line GL via the insulating film GI and the amorphous silicon layer AS'. Further, the source electrode ST that is formed at the same time that the drain line DL and the drain electrode DT are formed is formed to face the drain electrode DT on the semiconductor layer AS and to have an extension extended slightly toward the pixel area side from its end on the semiconductor layer AS. This extension extends to reach the pad portion PD that is connected to the pixel electrode PX. At this time, referring to FIG. 2, the drain electrode DT is formed into, for example, a U-shaped pattern surrounding a leading end portion of the source electrode ST. This allows the thin-film transistor TFT to have a greater channel width.

The thin-film transistor TFT is formed as an inverted staggered metal-insulator-semiconductor (MIS) transistor having the gate line GL as the gate electrode. The transistor of the MIS structure is driven such that the drain electrode DT and the source electrode ST are interchanged by application of a bias. In this specification, however, for the sake of simplicity, a side connected to the drain line DL is referred to as the drain electrode DT and a side connected to the pixel electrode PX is referred to as the source electrode ST.

A protective film PAS formed of an insulating film covering the thin-film transistor TFT is formed on the surface of the first substrate SUB1. The protective film PAS avoids direct contact between the thin-film transistor TFT and the liquid crystal and flattens the surface of the first substrate SUB1 that is uneven during the formation of the thin-film transistor TFT. The common electrode CT is formed on the upper surface of the protective film PAS, a capacitive insulating film CI that functions as a dielectric film of a capacitive element is formed on an upper layer of the common electrode CT, and the pixel electrode PX is formed on an upper layer of, and via, the capacitive insulating film CI. At this time, the capacitive insulating film CI and the protective film PAS have a contact hole CH reaching the pad portion PD. The pixel electrode PX and the source electrode ST of the thin-film transistor TFT are electrically connected with each other through the contact hole CH.

Particularly noteworthy about the liquid crystal display device according to the first embodiment of the present invention is that the pixel electrode PX is formed into a linear (comb-like) electrode. Specifically, a transparent conductive film formed of, for example, ITO is formed planarly within the pixel area and a plurality of slits SLT that intersect the y direction are formed at a portion corresponding to a backlight ray passage area AP; the linear, comb-like electrode that is superimposed on the common electrode CT is thereby formed within the passage area AP. Additionally, in the liquid crystal display device according to the first embodiment of the present invention, a single pixel area is divided into two parts, one near the thin-film transistor TFT and the other remote therefrom, each having a unique slit SLT forming angle (an inclination angle relative to the y direction) different from each other. Different inclination angles result in the linear electrode portion in the passage area AP. The liquid crystal display device according to the first embodiment of the present invention thereby offers transmissivity comparable to that of the well-known TN system in the area in which the slits SLT are formed and achieves less view angle dependence.

Referring to FIG. 2, at a portion at which the part near the thin-film transistor TFT (a first pixel part) contacts the part remote therefrom (a second pixel part), the slit SLT formed in the pixel electrode PX is adapted not to reach a distal end side. As a result, the electrodes formed in a portion sandwiched between the first pixel part and the second pixel part are not linear. Specifically, in this portion, linear electrodes with different inclination angles overlap each other to form an integrated electrode shape. A lateral electric field extending from the pixel electrode PX to the common electrode CT is not, therefore, produced in this portion, so that the portion is an unusual domain in which the liquid crystal (liquid crystal molecules) is not controlled (driven). As a result, a slight amount of the backlight ray is transmitted through the portion, resulting in reduced contrast. By contrast, the liquid crystal display device according to the first embodiment of the present invention has the light-blocking film SB that protrudes in the x direction from the drain line DL to the pixel area, by which leakage of the backlight ray in the unusual domain can be significantly inhibited. This expands the dynamic range.

Detailed Arrangement of the Light-Blocking Film

The arrangement of the light-blocking film SB will be described in detail below with reference to FIGS. 2 and 4. As evident from FIG. 2, the light-blocking film SB of the liquid crystal display device according to the first embodiment of the present invention is formed of a metal thin film extending from the drain line DL. The light-blocking film SB is shaped to have a side that extends along a side edge portion of the electrode formed in a boundary between the two pixel parts. Specifically, with the pixel of the first embodiment of the present invention, the slits SLT formed on the upper half part of FIG. 2 extend downwardly toward the right-hand side, so that the linear electrodes formed by the slits SLT are rightwardly downward. The slits SLT formed on the lower half part of FIG. 2, in contrast, extend upwardly toward the right-hand side, so that the linear electrodes formed by the slits SLT are rightwardly upward.

Consequently, the light-blocking film SB that protrudes rightwardly (inwardly of the passage area AP of the pixel) from the drain line DL on the left-hand side in FIG. 2 along the x direction (inwardly of the passage area AP of the pixel) has a trapezoidal shape having a y-direction width at a leading end portion thereof becoming gradually smaller at greater amounts of protrusion. By contrast, the light-blocking film SB that protrudes leftwardly (inwardly of the passage area AP of the pixel) from the drain line DL on the right-hand side in FIG. 2 along the x direction has a trapezoidal shape having a y-direction width at a leading end portion thereof becoming gradually larger at greater amounts of protrusion. At this time, in the liquid crystal display device according to the first embodiment of the present invention, the two light-blocking films SB have an equal area. The foregoing arrangements prevent occurrence of an abrupt voltage change attributable to parasitic capacitance (capacity between source and drain Cds, capacity between drain line and common electrode Cdc) involved in forming the light-blocking films SB in the drain line DL when, for example, each pixel is driven by dot inversion drive. In addition, in the liquid crystal display device according to the first embodiment of the present invention, the light-blocking film SB is formed by extending part of the metal thin film that forms the drain line DL, so that a special effect can be achieved of forming the light-blocking film SB without having to add additional manufacturing processes.

Referring to FIG. 4, the light-blocking film SB is formed by extending, together with the amorphous silicon layer AS', part of the metal thin film drain line DL formed on the upper layer of the amorphous silicon layer AS' in the x direction. In this way, the light-blocking film SB is formed so as to be superimposed over the transparent conductive film that serves as the pixel electrode PX. This results in the backlight ray transmitting from the lower side to the upper side in FIG. 4 being blocked by the light-blocking film SB, so that the backlight ray that is transmitted as a result of occurrence of the unusual domain can be blocked. In addition, control of the liquid crystal by the electric field cannot be performed between the common electrode CT and the pixel electrode PX, so that the transmissivity that indicates the amount of the backlight ray transmitted involved in the formation of the light-blocking film SB according to the embodiment of the present invention can be prevented from being decreased.

Figure 5:
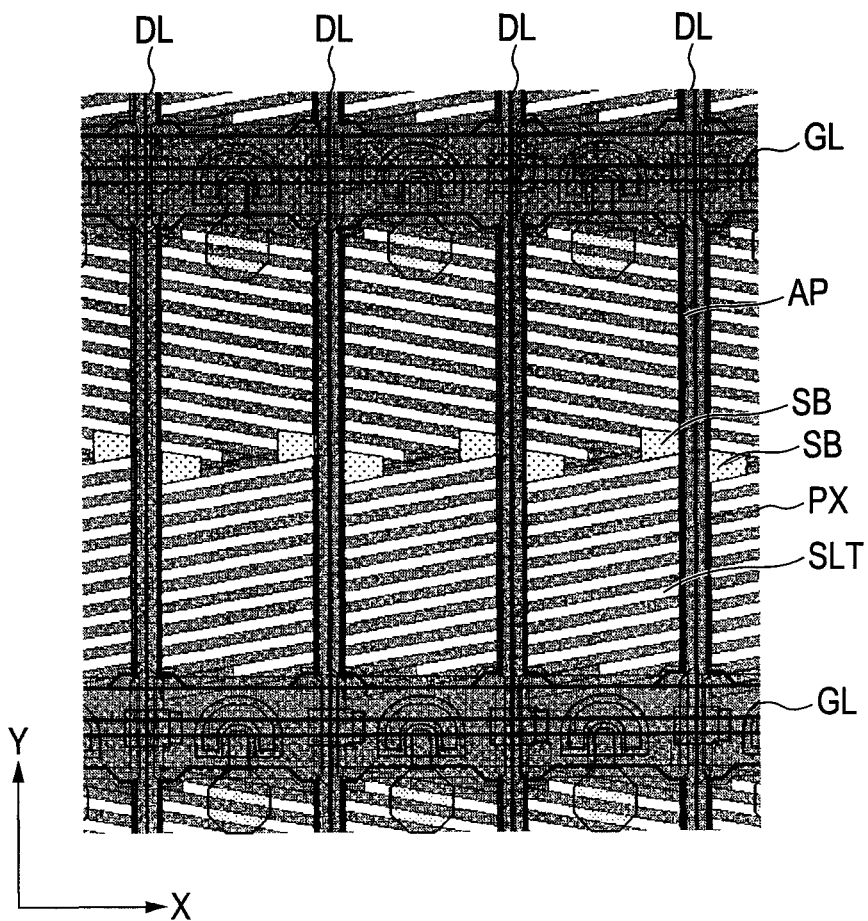
FIG. 5 is an illustration showing a pattern of the liquid crystal display device according to the first embodiment of the present invention.
Figure 6:
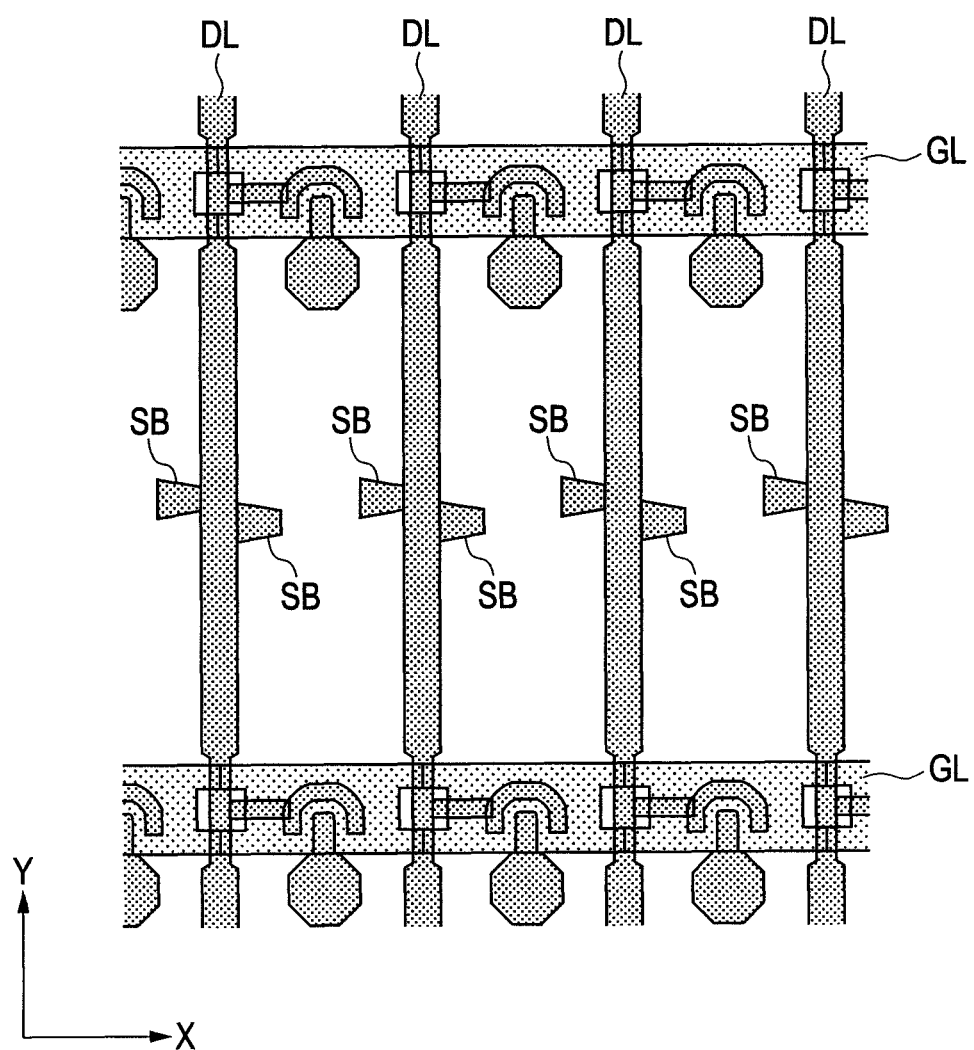
FIG. 6 is an illustration showing a pattern before formation of a protective film of the liquid crystal display device according to the first embodiment of the present invention.

FIG. 5 is an illustration showing a pattern of the liquid crystal display device according to the first embodiment of the present invention. FIG. 6 is an illustration showing a pattern before the formation of the protective film of the liquid crystal display device according to the first embodiment of the present invention. Note that, in FIGS. 5 and 6, the light-blocking films SB are shown in a hatched line different from the pattern of the drain lines DL in order to clearly identify the light-blocking films SB according to the first embodiment of the present invention.

Referring to FIGS. 5 and 6, in the liquid crystal display device according to the first embodiment of the present invention, the gate lines GL are disposed in juxtaposition in the y direction and the drain lines DL are disposed in juxtaposition in the x direction, wherein the distance between two adjacent drain lines DL is smaller than that between two adjacent gate lines GL. The pixel in the liquid crystal display device according to the first embodiment of the present invention, therefore, has two parts (pixel parts) in a direction in which the drain lines DL extend. In each of the two pixel parts, the slits SLT, specifically, the linear electrodes have a unique inclination angle that is different from that in the other pixel part. At this time, an electrode portion in which linear electrodes with different inclinations are integrated together, specifically, an unusual domain in which the electrodes are not linear and the liquid crystal molecules cannot be controlled is produced for each pixel. The light-blocking films SB formed through extension from the drain lines DL, however, shield the backlight ray. In addition, in the liquid crystal display device according to the first embodiment of the present invention, the light-blocking film SB is formed with a metal thin film, so that part of the backlight ray incident on the light-blocking film SB is reflected off to a backlight side. The backlight ray reflected back to the backlight side can, therefore, be made to be incident on the first substrate SUB1, which achieves a special effect of improving the maximum luminance. Furthermore, the light-blocking film SB of the first embodiment of the present invention is formed as part of the drain line DL, which achieves a special effect of minimizing deviation in positions at which the pixel electrode PX and the light-blocking film SB are formed.

As described heretofore, in the liquid crystal display device according to the first embodiment of the present invention, one pixel is formed to include the first pixel part having the linear electrodes inclined in a first direction and the second pixel part having the linear electrodes inclined in a second direction. The pixel is disposed in a matrix pattern. The light-blocking film SB is formed to cover a portion in which the electrodes are not linear and which is a boundary where the linear electrodes in the first pixel part and the linear electrodes in the second pixel part are integrated together. The light-blocking films SB are shaped to follow along the side edges of the linear electrodes extending in the first and second inclination directions. This prevents transmission of the backlight ray arising from the occurrence of the unusual domain and expands the dynamic range without allowing the transmissivity of the liquid crystal display device of the IPS system to be reduced.

Figure 7:
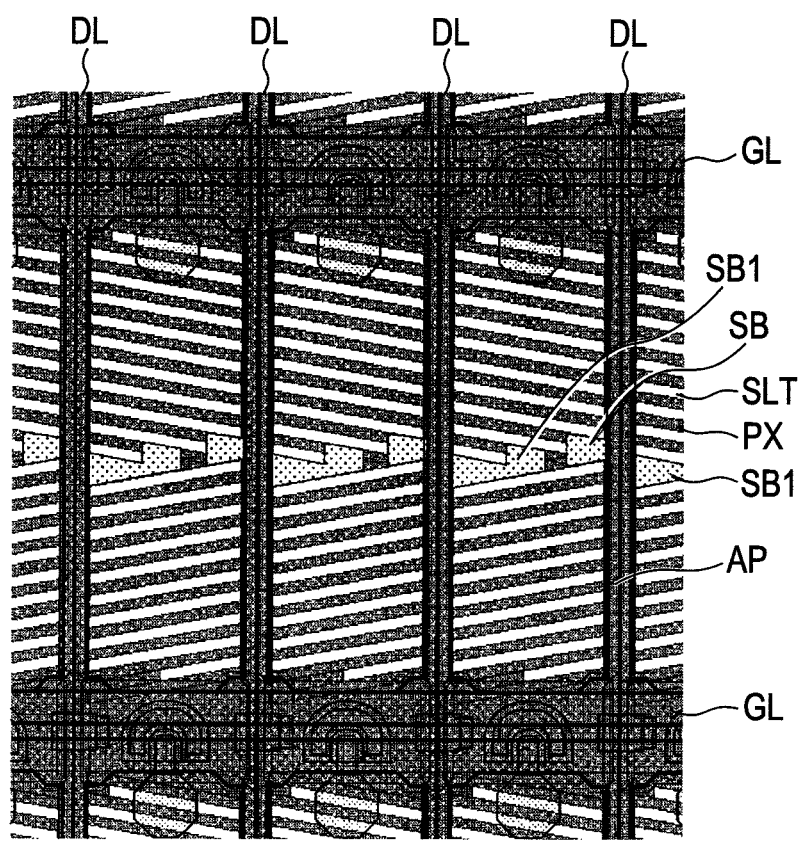
FIG. 7 is a plan view for illustrating another pixel arrangement in the liquid crystal display device according to the first embodiment of the present invention.

In the liquid crystal display device according to the first embodiment of the present invention, the light-blocking films SB extended from the drain lines DL have the same shape; however, they may be shaped differently. For example, referring to FIG. 7, a light-blocking film SB1 may be formed to have a greater amount of protrusion for the light-blocking part that is formed by being extended from the side connected to the drain electrode DT of the thin-film transistor TFT disposed for each pixel. The amount of the backlight ray transmitted arising from the unusual domain of the electrode part formed at the central portion of the pixel can thereby be further reduced. This results in even further expansion of the dynamic range. Note that, in FIG. 7, the light-blocking film SB and the light-blocking film SB1 are connected to the drain lines DL adjacent to each other and the light-blocking film SB and the light-blocking film SB1 are spaced apart with a predetermined distance from each other to thereby establish no electrical connection therebetween.

Second Embodiment

Figure 8:
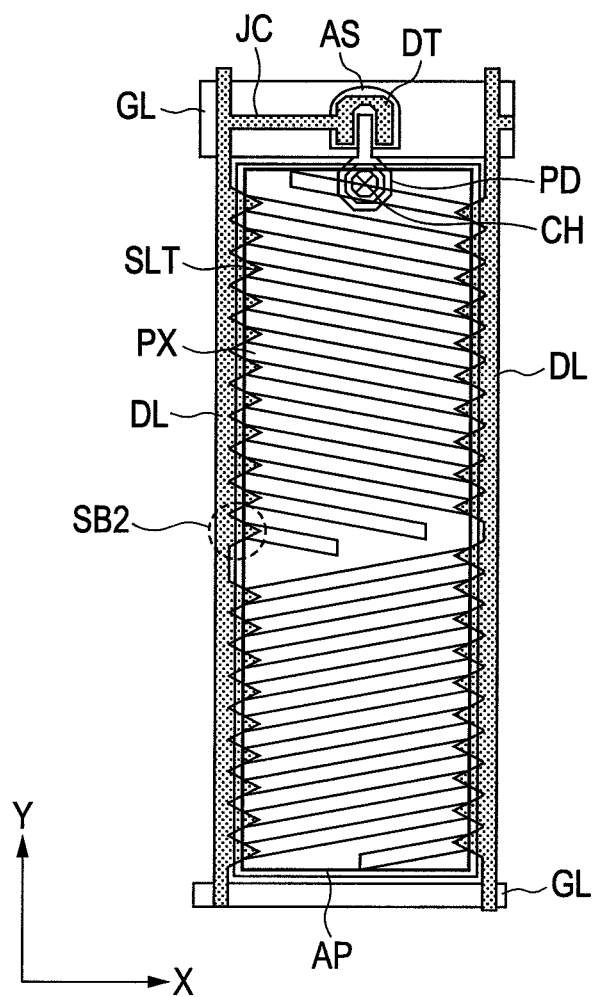
FIG. 8 is a plan view for illustrating a pixel arrangement in a liquid crystal display device according to a second embodiment of the present invention.
Figure 9:
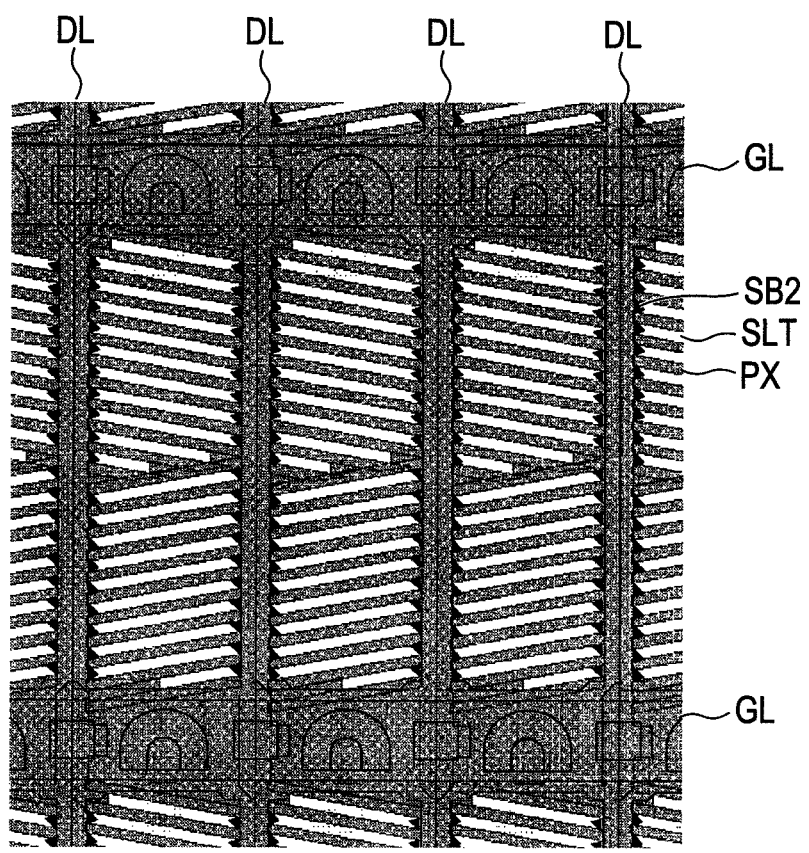
FIG. 9 is an enlarged view showing a pixel pattern in the liquid crystal display device according to the second embodiment of the present invention.

FIG. 8 is a plan view for illustrating a pixel arrangement in a liquid crystal display device according to a second embodiment of the present invention. FIG. 9 is an enlarged view showing a pixel pattern in the liquid crystal display device according to the second embodiment of the present invention. To clearly identify the light-blocking films according to the second embodiment of the present invention in FIG. 9, a light-blocking film SB2 is shown in a hatched line different from the pattern of drain lines DL. In addition, the liquid crystal display device according to the second embodiment of the present invention is arranged in the same manner as the liquid crystal display device according to the first embodiment of the present invention, except the light-blocking film SB2. The arrangement of the light-blocking film SB2 will therefore be described in detail below.

Referring to FIGS. 8 and 9, in the liquid crystal display device according to the second embodiment of the present invention, too, a pixel area is defined by gate lines GL extending in the x direction and disposed in juxtaposition in the y direction and drain lines DL extending in the y direction and disposed in juxtaposition in the x direction. In addition, the pixel is shaped to be a rectangle having the drain lines DL extending in the y direction longer than the gate lines GL extending in the x direction. In the pixel area of the liquid crystal display device according to the second embodiment of the present invention, therefore, a plurality of slits SLT with closed ends are also formed in a transparent conductive film formed planarly on the pixel area. A linear electrode that is superimposed on a common electrode not shown is thereby formed within a backlight ray passage area AP.

Each of the slits SLT has a width in the y direction wider than a width in the x direction. Consequently, in the liquid crystal display device according to the second embodiment of the present invention, too, the light-blocking film SB2 is formed to extend from the drain line DL. At this time, in the arrangement of the liquid crystal display device according to the second embodiment of the present invention, the light-blocking film SB2 is formed to be superimposed on each end of the slits SLT. To implement such an arrangement, in the liquid crystal display device according to the second embodiment of the present invention, the light-blocking film SB2 protrudes in a direction perpendicular to a direction in which drain lines DL extend, specifically, in a direction of the backlight ray passage area AP of each pixel. Additionally, the light-blocking film SB2 of the liquid crystal display device according to the second embodiment of the present invention has a substantially triangular outline shape in which the width in the y direction gradually decreases according to the amount of protrusion. The triangle is not, however, the only possible shape of the light-blocking film SB2. Preferably, a portion in which the slit SLT is superimposed on the light-blocking film SB2 coincides with a portion in which the unusual domain occurs.

Through the foregoing arrangements, the liquid crystal display device according to the second embodiment of the present invention achieves a significant reduction in transmissivity in the area of the unusual domain that occurs on the ends of the slits SLT in the pixel electrode PX disposed in superimposition on the common electrode via a capacitive insulating film not shown, thereby greatly improving the dynamic range. The light-blocking film SB of the liquid crystal display device according to the first embodiment of the present invention may be combined with the light-blocking film SB2 of the liquid crystal display device according to the second embodiment of the present invention to thereby further reduce transmission of the backlight ray in the area of the unusual domain arising from the shape of the pixel electrode PX. This leads to an even more improved dynamic range of the liquid crystal display device.

In the liquid crystal display devices according to the first and second embodiments of the present invention, the light-blocking films SB, SB1, SB2 are formed by using the metal thin film on the same layer as the drain lines DL and electrically connected to the drain lines DL. This is, however, not the only possible arrangement. For example, the light-blocking films SB, SB1, SB2 may be formed with a metal thin film on another layer, such as the gate lines GL, another thin film having great light-blocking performance, or a black matrix. In addition, the light-blocking films SB, SB1, SB2 may be in an electrically insulated, floating state; however, the light-blocking films SB, SB1, SB2 are preferably connected to, for example, other signal lines to thereby maintain a predetermined potential.

While the present invention has been particularly shown and described with reference to the preferred embodiments, it will be understood by those skilled in the art that various changes in form and detail may be made therein without departing from the spirit and scope of the invention.

DESCRIPTION OF THE REFERENCE NUMERALS

PNL: liquid crystal display panel, AR: display area, SUB1: first substrate, SUB2: second substrate, DL: drain line, GL: gate line, CL: common line, TFT: thin-film transistor, PX: pixel electrode, CT: common electrode, SL: sealant, DR: semiconductor chip, FPC: flexible printed circuit board, PAS: protective film, CI: capacitive insulating film, PD: pad portion, CH: contact hole, ST: source electrode, DT: drain electrode, GT: gate electrode, GI: insulating film, AS: semiconductor layer, AS': amorphous silicon layer, JC: connection, IN: underlayer film, SB, SB1, SB2: light-blocking film, SLT: slit, AP: backlight ray passage area

What is claimed is:
1. A liquid crystal display device comprising:
a pixel area surrounded and defined by a first drain line, a second drain line, a first gate line, and a second gate line, wherein the pixel area includes:
a first pixel part having a flat surface-like planar electrode, and a plurality of line-like linear electrodes that are formed in superimposition on the planar electrode via an insulating film and extend in a first direction;
a second pixel part having the planar electrode and a plurality of line-like linear electrodes that are formed in superimposition on the planar electrode via the insulating film and extend in a second direction;

a first boundary electrode that is formed at a side of the first drain line in an area sandwiched between the first pixel part and the second pixel part, and has a side edge portion inclined in the first direction and a side edge portion inclined in the second direction;

a second boundary electrode that is formed at a side of the second drain line in an area sandwiched between the first pixel part and the second pixel part, and has a side edge portion inclined in the first direction and a side edge portion inclined in the second direction, a first light-blocking film, integrally formed with the first drain line, that is formed in superimposition on the first boundary electrode, and having sides formed to extend along the side edge portions of the first boundary electrode inclined in the first and second directions, a second light-blocking film, integrally formed with the second drain line, that is formed in superimposition on the second boundary electrode, and having sides formed to extend along the side edge portions of the second boundary electrode inclined in the first and second directions, and wherein the first light-blocking film and the second light-blocking film are insulated from each other.

2. The liquid crystal display device according to claim 1, wherein the first light-blocking film and the second light-blocking film have an equal area.

3. A liquid crystal display device comprising:

a liquid crystal display panel; and a backlight source that illuminates a back surface of the liquid crystal display panel with a backlight ray, the liquid crystal display panel including:

a first substrate having a pixel area surrounded and defined by a first drain line, a second drain line and a first gate line and a second drain line;

a second substrate disposed to face the first substrate; and a liquid crystal layer clamped between the first substrate and the second substrate, wherein the pixel area includes:

a first pixel part having a flat surface-like planar electrode; and a plurality of line-like linear electrodes that are formed in superimposition on the planar electrode via an insulating film and extend in a first direction;

a second pixel part having the planar electrode and a plurality of line-like linear electrodes that are formed in superimposition on the planar electrode via the insulating film and extend in a second direction;

a first boundary electrode that is formed at a side of the first drain line in an area sandwiched between the first pixel part and the second pixel part, and has a side edge portion inclined in the first direction and a side edge portion inclined in the second direction, a second boundary electrode that is formed at a side of the second drain line in an area sandwiched between the first pixel part and the second pixel part, and has a side edge portion inclined in the first direction and a side edge portion inclined in the second direction, a first light-blocking film, integrally formed with the first drain line, that is formed in superimposition on the first boundary electrode, and has sides formed to extend along the side edge portions of the first boundary electrode inclined in the first and second directions, a second light-blocking film, integrally formed with the first drain line, that is formed in superimposition on the second boundary electrode, and has sides formed to extend along the side edge portions of the second boundary electrode inclined in the first and second directions, wherein the first light-blocking film and the second light-blocking film are insulated from each other, and the first light-blocking film and the second light-blocking film blocking the backlight ray.

4. The liquid crystal display device according to claim 3, wherein the first light-blocking film and the second light-blocking film have an equal area.

* * * * *